United States Patent [19]

Butters et al.

[11] Patent Number: 4,857,386

[45] Date of Patent: Aug. 15, 1989

[54] INKABLE SHEET

[75] Inventors: Alan Butters, Ipswich; Diana C. Blackmore; Darrin J. Page, both of Colchester, all of England

[73] Assignee: Imperial Chemical Industries PLC, London, United Kingdom

[21] Appl. No.: 10,523

[22] Filed: Feb. 3, 1987

[30] Foreign Application Priority Data

Feb. 3, 1986 [GB] United Kingdom ................. 8602593

[51] Int. Cl.[4] .......................... B41M 5/18; B05D 3/02; B32B 27/06; G03C 5/54

[52] U.S. Cl. .................................... 428/206; 428/483; 428/211; 428/910; 428/913; 428/195; 427/393.5; 430/200

[58] Field of Search ............... 428/206, 211, 483, 910, 428/913

[56] References Cited

U.S. PATENT DOCUMENTS 4,423,116 12/1983 Fox ...................................... 428/411

FOREIGN PATENT DOCUMENTS 1108581 5/1986 Japan .
2114767A 8/1983 United Kingdom .

*Primary Examiner*—P. C. Ives
*Attorney, Agent, or Firm*—Cushman, Darby & Cushman

[57] ABSTRACT

An inkable sheet comprises a base sheet, such as a PET film, having on a surface thereof an ink-absorbent resin layer comprising a vinyl pyrrolidone polymer and an acrylic or methacrylic polymer.

8 Claims, 1 Drawing Sheet

INKABLE SHEET

BACKGROUND OF THE INVENTION (a) Technical Field of Invention

This invention relates to an inkable sheet, and, in particular, to a sheet suitable for use with a mechanical printing assembly, such as an ink jet printer or a pen plotter.

(b) Background of the Art

With the recent proliferation of micro-computers and colour monitors there has been a massive growth in the amount of information available for display in colour. Presentation of such information has created a demand for hard copy, for example—on paper sheets, but increasingly on transparent polymeric films which are capable of serving as imaged transparencies for viewing in a transmission mode. Preparation of the desired hard copy is conveniently effected by, for example, an ink jet printer or a pen plotter, using an aqueous or an aqueous-organic solvent-based ink.

Ink jet printing is already established as a technique for printing variable information such as address labels, multi-color graphics, and the like. A simple form of ink jet printer comprises a capillary tube coupled to an ink reservoir and a piezo-electric element which, on application of a voltage pulse, ejects an ink droplet from the capillary tube at high velocity (e.g. up to 20 $ms^{-1}$) onto an ink-receptive sheet. Movement of the ink jet may be computer controlled, and new characters may therefore be formed and printed at electronic speeds. To derive advantage from this high speed operating capability requires the use of an ink-receptive sheet which will quickly absorb the high velocity ink droplet without blotting or bleeding. Although plastics sheets may be employed, these generally tend to exhibit inferior ink absorption and retention characteristics. In particular, drying of an applied ink pattern is slow, and immediate handling of a freshly imaged sheet is therefore prevented.

Pen plotter assemblies are extensively used in drawing offices, and particularly in the generation of computer aided designs. The advent of polymeric recording sheets has revealed that the formation thereon of inked images of acceptable quality usually requires the development of special, and expensive, pens. However, an inkable sheet according to the invention permits the use of a simple, inexpensive, fibre-tipped, aqueous based or hydrophilic ink, pen of the kind hitherto conventionally used with paper recording sheets.

(c) The Prior Art

Various recording sheets have been proposed for use with ink jet printers. In particular, EP No. 125113-A discloses a recording material receptive to inks which comprises a substrate material that is hydrophobic and that has a surface coated with polyvinylpyrrolidone. Suitable substrates are said to include a polyester film, and the surface coating may include a compatible matrix-forming hydrophilic polymer—such as, gelatin or polyvinyl alcohol. We have observed that an inked pattern applied to such a recording material is relatively slow to dry, and that the dried pattern exhibits poor resistance to washing with water.

We have now devised an inkable sheet which is particularly suitable as a recording sheet for use with a mechanical printing assembly, such as an ink jet printer or a pen plotter, the sheet exhibiting an improved rate of ink absorption, and improved resistance to moisture.

SUMMARY OF THE INVENTION

Accordingly, the present invention provides an inkable sheet comprising a base sheet having at a surface thereof an ink-absorbent polymeric resin layer comprising a vinyl pyrrolidone polymer and an acrylic or methacrylic polymer.

The invention also provides a method of preparing an inkable sheet comprising applying to a surface of a base sheet a coating medium comprising a vinyl pyrrolidone polymer and an acrylic or methacrylic polymer and drying the applied coating medium to yield a substantially water-insoluble, ink-absorbent, polymeric layer on a surface of the base sheet.

DETAILED DESCRIPTION AND PREFERRED EMBODIMENTS OF THE INVENTION

Figure 1:
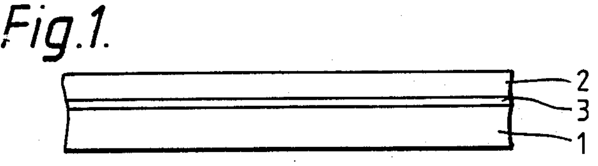

The ink-absorbent layer permits rapid drying of an applied inked pattern, and is desirably such that an aqueous-diethylene glycol (50:50 w/w) based ink, or similar composition, applied to the absorbent surface of a sheet will be none sticky and resistant to off-setting when the inked surface is placed in contact with the surface of a paper sheet within a few (for example, 15) minutes of application of the ink. Desirably, the applied ink should be absorbed by the absorbent layer to an extent such that smudging does not occur on rubbing with a finger within 50 seconds, and preferably within 30 seconds of application of the ink.

An inkable sheet according to the invention is of particular utility in the production of an imaged transparency for viewing in a transmission mode, as for example in assocation with an overhead projector in which a light source is positioned behind a sheet bearing an inked image and the image is observed from the image side by light transmitted through the sheet. Desirably, therefore the resin layer should be such that the non-inked layer is initially transparent, i.e. substantially non-light-scattering.

The vinyl pyrrolidone polymer component of the ink-absorbent layer may comprise a homopolymer or a copolymer—for example, with a copolymerisable monomer such as vinyl acetate. Vinyl pyrrolidone polymers having molecular weights in excess of about 100,000 are generally preferred.

The acrylic or methacrylic polymer component of the resin layer may be a homopolymer or a copolymer. Suitable monomeric components of such polymers include acrylic acid, methacrylic acid and lower alkyl (1 to 6 carbon atoms) acrylate and methacrylate esters. A particularly suitable ink absorbent resin contains free carboxylic acid groups, and has an acid number (mg KOH per g) not exceeding 150, and preferably of from 20 to 120, for example—a copolymer of methacrylic acid and methylmethacrylate with an acid number (mg KOH per g) of from about 60 to 100, particularly about 80. In one embodiment of the invention the acrylic or methacrylic polymer component contains hydroxylic functionality.

The relative proportions of the respective components in the resin layer may be varied within wide limits, although it is preferred that the vinyl pyrrolidone polymer comprises from about 30 to 60, especially from 40 to 50, percent by weight of the resin layer. A preferred ink absorbent layer comprises (a) a vinyl pyrrolidone polymer and (b) an acrylic or methacrylic polymer in a weight ratio of about 40:60.

Being easily soluble in water the vinyl pyrrolidone polymer component contributes to the water absorption characteristics of the matrix, but is also capable of retaining organic solvents, and therefore promotes bonding of an ink subsequently applied from an aqueous-organic solvent medium.

To improve the ageing behavior of the resin layer and promote absorbtion of a subsequently applied ink, a surfactant may, if desired, be incorporated into the resin layer. A cationic, surfactant, such as a quaternary ammonium salt, is suitable for this purpose.

If desired, the ink-absorbent layer may additionally comprise a particulate filler to improve the handling characteristics of the sheet. Suitable fillers incude silica, desirably of a particle size not exceeding 20, and preferably less than 12, for example 8, microns. The amount of filler employed will be dictated by the desired characteristics of the sheet but will generally be low to ensure that the optical characteristics (such as haze) of the sheet remain unimpaired. Typical filler loadings are of the order of less than 0.5, and preferably from 0.1 to 0.2, percent by weight of the resin component(s).

The ink absorbent layer is conveniently applied to the base sheet by a conventional coating technique—for example, by deposition from a solution or dispersion of the resin(s) in a volatile medium, such as an aqueous or organic solvent medium.

Drying of the applied ink absorbent resin layer may be effected by conventional drying techniques—for example, by suspending the coated base sheet in a hot air oven maintained at an appropriate temperature. A drying temperature of about 120° C., is usually suitable for a polyester base sheet.

The thickness of the dry ink-absorbent resin layer may vary over a wide range but is conveniently within a range of from 2 to 25 microns, and preferably from 3 to 10, for example 6, microns.

A base sheet for use in the production of an inkable sheet according to the invention suitably comprises any polymeric material capable of forming a self-supporting opaque, or preferably transparent, film or sheet.

By a "self-supporting film or sheet" is meant a film or sheet capable of an independent existence in the absence of a supporting substrate.

Suitable polymeric materials for use in the production of a base sheet are usually thermoplastics polymers, and include cellulose esters, e.g. cellulose acetate, polystyrene, polyamides, polymers and copolymers of vinyl chloride, polymers and copolymers of olefines, e.g. polypropylene, polysulphones, polycarbonates and particularly linear polyesters which may be obtained by condensing one or more dicarboxylic acids or their lower alkyl (up to 6 carbon atoms) diesters, e.g. terephthalic acid, isophthalic acid, phthalic acid, 2,5-, 2,6- and 2,7-napthalene dicarboxylic acid, succinic acid, sebacic acid, adipic acid, azelaic acid, diphenyldicarboxylic acid and hexahydroterephthalic acid or bis-p-carboxyl phenoxy ethane (optionally with a mono-carboxylic acid, such as pivalic acid) with one or more glycols, e.g. ethylene glycol, 1,3-propanediol, 1,4-butanediol, neopentyl glycol and 1,4-cyclohexane-dimethanol. A biaxially oriented and heat-set film of polyethylene terephthalate is particularly useful as a base sheet for the production of an inkable sheet according to the invention and may be produced by any of the processes known in the art, e.g. as described in British patent specification 838 708.

The base sheet is suitably of a thickness from 25 to 300, particularly from 50 to 175 and especially from 75 to 125 microns.

To promote adhesion of the resin layer to a polymeric base sheet, it is desirable first to treat a surface of the base sheet with a priming medium. Creation of a priming layer is conveniently effected by treating a surface of the polymer base sheet with an agent known in the art to have a solvent or swelling action on the substrate polymer. Examples of such conventional agents, which are particularly suitable for the treatment of a polyester substrate, include a halogenated phenol dissolved in a common organic solvent e.g. a solution of p-chloro-meta-cresol, 2,4-dichlorophenol, 2,4,5- or 2,4,6-trichlorophenol or 4-chlororesorcinol in acetone or methanol. In addition, and preferably, the priming solution may contain a partially hydrolysed vinyl chloride-vinyl acetate copolymer. Such a copolymer conveniently contains from 60 to 98 percent of vinyl chloride, and from 0.5 to 3% of hydroxyl units, by weight of the copolymer. The molecular weight (number average) of the copolymer is conveniently in a range of from 10,000 to 30,000, and preferably from 16,500 to 25,000.

If desired, a plurality of priming layers may be sequentially applied to a base sheet.

The priming agent is suitably applied at a concentration level which will yield a priming layer having a relatively thin dry coat thickness—for example, generally less than 2 microns, and preferably, less than 1 micron.

An inkable sheet according to the invention is particularly suitable for use in the preparation of inked transparencies for use in a transmission mode, for example—with an overhead projector. Retention in the resin layer of the solvent medium of an applied ink ensures rapid drying of the ink, and facilitates immediate use of the imaged sheet.

Figure 2:
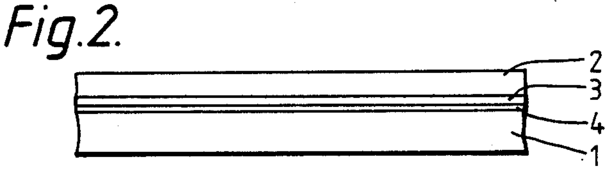
Figure 3:
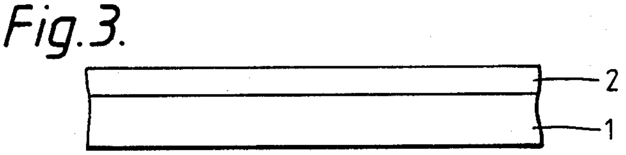

The invention is illustrated by reference to the accompanying drawings in which:

FIG. 1 is a schematic elevation (not to scale) of a portion of an inkable sheet comprising a polymeric base sheet 1 to one surface of which an ink-absorbent matrix layer 2 is bonded by an intermediate primer layer 3, FIG. 2 is a fragmentary schematic elevation of a similar sheet in which an additional layer 4 of a priming medium is provided at the interface between base sheet 1 and primer layer 3, and FIG. 3 is a fragmentary schematic elevation of a similar sheet in which an absorbent matrix layer 2 is bonded directly to a surface of an unprimed base sheet 1.

The invention is further illustrated by reference to the following Examples.

EXAMPLE 1

Each surface of a biaxially oriented, uncoated, polyethylene terephthalate film base sheet of about 100 microns thickness was primed with a solution in acetone of p-chloro-m-cresol (3.75% weight/vol) and VINYLITE VAGH (0.75% weight/vol). VINYLITE VAGH is a copolymer of vinylchloride (90 wt %) and vinyl acetate (4 wt %) with 2.3 wt % hydroxyl content and of average molecular weight 23,000.

The primed sheet was then dried in a hot air oven maintained at a temperature of 80° C. to leave a residual prime layer of approximately 0.2 micron thickness on each surface.

Each primed surface was then coated with the following solution:

Polyvinyl pyrrolidone, PVP-K90: 40 g
Acrylic Copolymer (CARBOSET 525): 60 g
Methanol: 200 ml
Acetone: 800 ml
Diacetone Alcohol: 100 ml
Butanol: 5 ml
Silica (DEGUSSA FK 520 DS): 0.2 g
Quat Ammonium Surfactant (CYASTAT SP): 2.5 g and the coated base sheet was dried at a temperature of 100° C. to yield a resin layer of about 6 microns thickness on each surface. (PVP-K90 is a polyvinyl pyrrolidone supplied by GAF(GB) Ltd).

Characters printed on the resin layer using an aqueous-diethylene glycol-based ink (50:50 w/w) appeared, on projection, as clear coloured characters against a white background. The characters remained clear over a long period (>6 months) and dried within 15 seconds of printing to give a non-sticky image which could be interleaved with paper without off-setting of the coloured printed areas. The image was resistant to washing with water.

EXAMPLE 2

The procedure of Example 1 was repeated, save that each primed surface of the base sheet was coated with a solution of the following composition:

Polyvinyl pyrrolidone, PVP-K90: 3.6 g
Acrylic Copolymer (CARBOSET 525): 5.35 g
Methanol: 20 ml
Acetone: 64 ml
Diacetone Alcohol: 8 ml
Isopropanol: 0.75 ml
Silica (DEGUSSA FK 320 DS): 0.018 g
Quat Ammonium Surfactant (CYASTAT SP): 0.225 g and the coated base sheet was dried for 5 minutes at a temperature of 110° C. to yield a resin layer of about 5.5 microns thickness on-each surface. (PVP-K90 is a polyvinyl pyrrolidone supplied by GAF(GB) Ltd).

Line and dot patterns drawn with a pen plotter on the resin layer using an aqueous-formamide-based ink dried rapidly at ambient temperature, the lines within 1 second, and the dots within 30 seconds, of printing, to yield a non-sticky image which could be interleaved with paper without off-setting of the coloured printed areas. The printed characters remained clear for at least 6 months and, on projection, appeared as clear coloured patterns against a white background.

The image was substantially resistant to washing with water, and the resin layer was completely resistant to washing with water.

EXAMPLE 3

This is a comparative Example, not according to the invention.

The procedure of Example 2 was repeated, save that each primed surface of the base sheet was coated with a solution of the following composition:

Polyvinyl pyrrolidone (PVP-K90): 10 g
Methanol: 30 ml
Acetone: 70 ml and the coated base sheet was dried for 5 minutes at a temperature of 110° C. to yield a resin layer of about 6 microns thickness on each surface.

The drying times at ambient temperature of patterns drawn on the resin layer using an aqueous-formamide-based ink were as follows:

Line: 3 seconds
Dot: 360 seconds

Both the image and resin coating layers were easily removed by washing with water.

EXAMPLE 4

This is also a comparative Example, not according to the invention.

The procedure of Example 3 was repeated, save that the coating resin employed was of the following composition:

Acrylic copolymer (CARBOSET 525): 10 g
Methanol: 30 ml
Acetone: 70 ml and was dried for 5 minutes at a temperature of 110° C. to yield a resin layer of about 6 microns thickness on each surface.

Drying times at ambient temperature of aqueous-formamide-based inked patterns were as follows:

Line: 600 seconds
Dot: >1000 seconds

The image alone was removed by washing with water, the resin layer being resistant to such treatment.

EXAMPLE 5

The procedure of Example 2 was repeated, save that each primed surface of the base sheet was coated with a solution of the following composition:

Polyvinyl pyrrolidone, PVP-K90: 7 g
Acrylic polymer (DP6-2976): 0.1 g
Methanol: 97 ml
Ethanol: 3 ml
Diacetone Alcohol: 5 ml
P-toluene-4-sulphonic acid: 0.1 g
Cross-linker (CYMEL): 0.1 g and was dried for 10 minutes at a temperature of 110° C. to yield a resin layer of about 10 microns thickness on each surface. DP6-2976 is a hydroxylated carboxylated acrylic having an acid number of 40, and available from Allied Colloids.

Drying times at ambient temperatures of aqueous-formamide-based inked patterns were as follows:

Line: 1 second
Dot: 5 seconds

EXAMPLE 6

This is a comparative Example, not according to the invention.

The procedure of Example 5 was repeated, save that the coating resin employed was of the following composition:

Acrylic polymer (DP6-2976): 50 g
Ethanol: 100 ml and was dried for 5 minutes at a temperature of 110° C. to yield a resin layer of about 6 microns thickness on each surface.

Drying times at ambient temperature of aqueous-formamide-based inked patterns were as follows:

Line: 600 seconds
Dot: >1000 seconds

We claim:

1. An inkable sheet comprising a base sheet having at a surface thereof an ink-absorbent polymeric resin layer wherein said resin comprises a vinyl pyrrolidone polymer and an acrylic or methacrylic polymer.

2. An inkable sheet according to claim 1 wherein the vinyl pyrrolidone polymer has a molecular weight in excess of 100,000.

3. An inkable sheet according to either of claims 1 wherein the acrylic or methacrylic polymer contains free carboxylic acid groups and has an acid number not exceeding 150.

4. An inkable sheet according to claim 1 wherein the acrylic or methacrylic polymer comprises hydroxylic funtionality.

5. An inkable sheet according to claim 1 wherein the vinyl pyrrolidone polymer comprises from 30 to 60 percent by weight of the resin layer.

6. An inkable sheet according to claim 1 further comprising in the ink absorbent resin layer, at least one additive selected from a surfactant and a particulate filler.

7. An inkable sheet according to claim 1 comprising at least one primer layer between the base sheet and resin layer.

8. An inkable sheet according to claim 1 wherein the base sheet comprises a biaxially oriented film of polyethylene terephthalate.

* * * * *